March 3, 1970        G. LANGE        3,498,050
METHOD AND APPARATUS FOR PRODUCING A ROUND-LINK CHAIN
Filed July 18, 1967
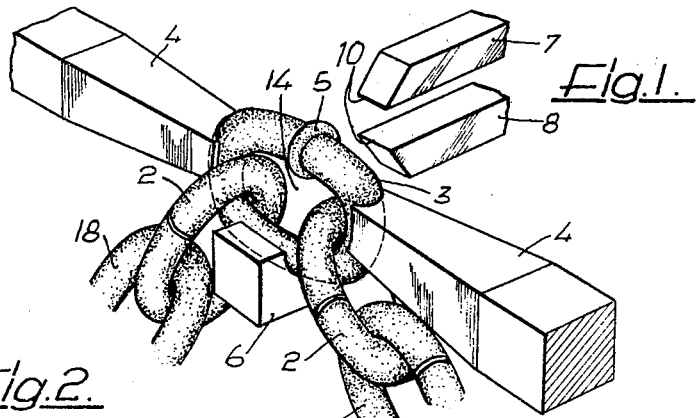
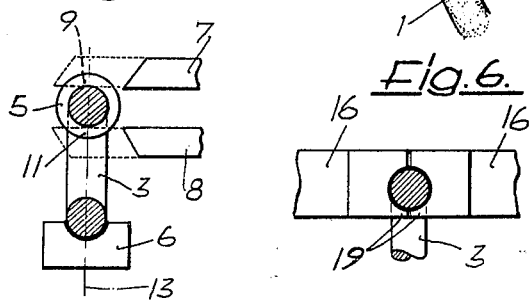
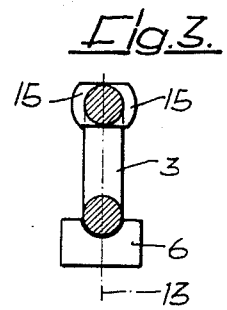
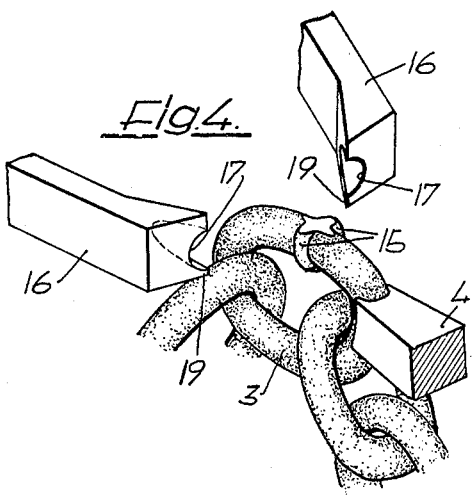
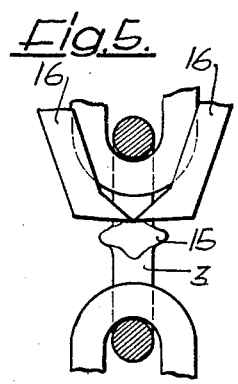
INVENTOR
Gerhard Lange
BY
ATTORNEY

United States Patent Office 3,498,050
Patented Mar. 3, 1970

3,498,050
METHOD AND APPARATUS FOR PRODUCING A ROUND-LINK CHAIN
Gerhard Lange, Reutlingen, Germany, assignor to Wafios Maschinenfabrik Wagner, Ficker & Schmid G.m.b.H., Reutlingen, Germany
Filed July 18, 1967, Ser. No. 654,252
Claims priority, application Germany, July 21, 1966, 1,627,714
Int. Cl. B21l *15/00*
U.S. Cl. 59—29                            5 Claims

ABSTRACT OF THE DISCLOSURE

A method and an apparatus for producing a round-link chain, wherein the mold bead on each chain link is trimmed off immediately following the electrical welding of each link by only two operations which permit the apparatus to be made of a very simple construction and the entire production of the chain to be carried out within a much shorter length of time than was required by previous methods.

---

The present invention relates to a method and an apparatus for producing a round-link chain wherein round rods are first bent to a round or oval link shape and hooped to each other, and the ends of each link are pressed by upsetting tools against each other and are then welded together electrically, whereby a weld bead is formed and large diametrically opposite lateral sectors of the weld bead are then removed by a longitudinal trimming operation by means of a pair of trimming tools, the cutting edges of which are concavely curved in accordance with the convex peripheral shape of the rod material of the link and are moved in the trimming operation in the direction of the axis of the rod, and wherein the smaller outer and inner sectors of the weld bead which are likewise diametrically opposite to each other are removed by a transverse trimming operation by means of another pair of trimming tools which, however, have straight cutting edges and for this trimming operation are moved in a direction at right angles to the plane of the link.

There are different methods known for trimming off the weld beads of electrically welded round links. If the chain links consist of unalloyed or low-alloyed steel, one of these methods provides, for example, that the weld bead while still white hot is deformed by means of two pressure tools in such a manner that two residual bead portions are formed on two diametrically opposite sides of the round link. These bead portions are subsequently removed by suitable means outside of the welding station. Although the removal of these compressed bead portions may be carried out relatively easily, the compressing of these portions causes the cinders which are formed on the link by the welding operation to be pressed into the surface of the link material. These impurities in the link material reduce the stability of the chain and increase its tendency to corrosion. These disadvantages of the known method as above described are so serious as practically to prohibit its application for the production of chains which are made of highly alloyed steel.

For this reason, other methods have been developed according to which the weld bead is not removed by compression but solely by trimming it off in the longitudinal direction of the link. This known method is, however, applicable only for producing round-link chains with long links in which the hole at the inside of each link is sufficiently large to permit the trimming tools to engage therein. However, since even in such a chain with long links the hole within each link is quite narrow, the parts of the trimming tools which engage into this hole must be made of a relatively weak construction and therefore will not last for a long time but will soon be worn excessively and also break frequently. If such a chain should have short links, the hole in each link would be filled out almost completely by the parts of the two adjacent links so that no space would remain therein for carrying out a longitudinal trimming operation. If the links have a sufficient length, this method is carried out by first trimming the weld bead in the longitudinal direction of the link which permits approximately 60% of the weld bead to be cut off in the form of two bead sectors each of which extends over a distance of approximately 110°. The two remaining parts of the bead at the inner and outer sides of the link which together amount to only approximately 70° are then compressed by a pair of pressure jaws acting at both sides of the plane of the link and are therefore strongly reduced at their root. After this compression, the remainders of the weld bead are removed by a transverse trimming operation.

This known method also does not prevent the disadvantage of the other method as previously mentioned that scale and other impurities from the welding bead are pressed into the surface of the chain link. This method has the further disadvantage that because of the stresses to which they are subjected the parts of the pressure tools which engage into the hole of the round link must be made of considerable strength. Consequently, this method can be applied for producing chains with short links only if the parts of the pressure tools which engage into the hole of the link are made relatively thin and weak and will therefore become worn after being used only for a short length of time. Finally, it is another serious disadvantage of this known method that it requires a considerable length of time since the trimming operation necessitates three separate steps which have to be carried out successively, namely, the longitudinal trimming step, the compressing steps, and the transverse trimming step.

It is an object of the present invention to provide a method of producing a round-link chain of the type as mentioned at the beginning, which permits the weld bead even of very short links to be properly trimmed off without requiring the bead to be compressed and without danger that the trimming tools will become worn prematurely or break off easily.

According to the present invention this object is attained by first carrying out the transverse trimming operation and immediately thereafter the longitudinal trimming operation. Due to the fact that the tools for the transverse trimming operation which are then movable in a direction at right angles to the plane of the chain link may be made of a relatively small size, this first step of the entire trimming operation permits the removal of the sector of the weld bead which is located within the hole of the link as well as of the diametrically opposite sector by a transverse movement of the trimming tools in a cutting direction at a right angle to the plane of the link. These transverse trimming operations have the effect that the remaining sectors of the weld bead at both sides of the plane of the link have crescent-shaped ends which extend at an acute angle to the central plane of the link. When these remaining sectors are being cut off during the longitudinal trimming operation by the tool parts which partly engage into the link, these crescent-shaped ends reduce considerably the stresses which are exerted upon these outer edge portions of the tools so that these parts may be made of a relatively thin size and weak construction but will still have a relatively long useful life. The method according to the invention has the further advantage that the entire trimming operation may be carried out by only two successive steps so that the length of time for the third step will be saved which was previously required. Since the new method does not require any compression of the weld bead, the additional very important advantage is attained that no impurities will be compressed into the surface of the round link which would impair the solidity of the link.

According to a preferred embodiment of the invention, the transverse trimming operation is already carried out while the upsetting tools and the welding electrodes are still applied upon the round link and while the weld bead is still red hot and therefore very soft.

Another preferred feature of the invention consists in carrying out both trimming steps while the upsetting tools also serve for holding the link in a fixed position while the trimming operations are carried out and there are no additional means required for this purpose, and the entire trimming may be done in the welding station itself. This, in turn, means that the apparatus for producing such a round-link chain may be of a very simple construction. According to another feature of the invention, this apparatus is designed so that the trimming tools are operatively connected to the driving means of the apparatus itself so that the transverse trimming tools will be actuated while the electrodes are still in engagement with the welded link and the longitudinal trimming tools will be actuated immediately after the electrodes are removed from the link.

The features and advantages of the present invention will become more clearly apparent from the detailed description thereof which is to be read with reference to the accompanying drawings, in which—

FIGURE 1 shows a perspective view of a round link which is held in a fixed position by upsetting tools, and it shows this link in the position immediately prior to being trimmed transversely;

FIGURES 2 and 3 show cross sections of the round link immediately prior to and immediately after the transverse trimming operation, respectively;

FIGURE 4 shows a persepective view similar to FIGURE 1 of the round link before being trimmed longitudinally;

FIGURE 5 shows a longitudinal section of the round link according to FIGURE 4 immediately before being trimmed longitudinally; while FIGURE 6 shows a cross section similar to FIGURE 3 of the round link immediately after being trimmed longitudinally.

In the drawing, FIGURE 1 illustrates several round links 1 and 2 of a round-link chain which are linked together, while another round link 3 of this chain is just located within the welding station in which the two ends of this link are pressed against each other by upsetting tools 4 and are welded together by the electric current of electrodes, not shown, whereby a weld bead 5 is formed on this link 3. During this upsetting and welding operation, link 3 is supported from below by a member 6 of the welding machine.

As long as the upsetting tools 4 and the electrodes (not shown) are still in engagement with the round link 3 and the weld bead 5 is still red-hot, a pair of trimming tools 7 and 8 which are provided with straight cutting edges 10 are moved in a direction at a right angle to the plane of link 3 for trimming the same transversely in the manner as shown in FIGURE 2 so that the upper tool 7 will cut off an outer sector 9 and the lower tool 8 an inner sector 11 of the weld bead 5 along parallel planes which extend at right angles to the central plane 13 of link 3. Thereafter, the tools 7 and 8 together with the electrodes are removed from the link 3. Even if the link 3 is very short, the size of its hole 14 is quite sufficient to permit the lower trimming tool 8 to pass freely therethrough in the mentioned direction at a right angle to the central plane 13 of the link. The bead sector 11 may therefore be trimmed transversely by means of a trimming tool 8 of a very sufficient thickness and strength.

After the transverse trimming operation has been completed, the two lateral bead sectors 15 still remain on the round link 3. These lateral sectors are removed from the link in an immediate following operation while link 3 is still held in a fixed position in the welding station by the upsetting tools 4. This is accomplished by a longitudinal trimming operation by means of trimming tools 16, the cutting edges 17 of which are arcuately curved in accordance with the peripheral surface of the rod of which the link 3 is made. These trimming tools 16 are moved toward the link 3 by means of suitable control elements of the welding machine, not shown, so that their cutting edges 17 will together encompass the entire peripheral surface of link 3. These trimming tools 16 are then moved in a conventional manner along the longitudinal axis of the chain link so that the lateral sectors 15 of the weld bead will be cut off while still being red-hot. After this operation, the trimming tools 16 are moved back to their original positions and at the same time the upsetting tools 4 are retracted from the welded and completely trimmed chain link 3. The chain is thereafter moved forwardly for a distance of two further links so that the chain link 1 as shown in FIGURE 1, will thus be passed into the welding position.

FIGURE 1 further illustrates that subsequent to the welding station the chain contains additional unwelded links 2 and welded links 18. These unwelded links 2 are then welded and trimmed in the same manner as described either in a second welding station or by passing the chain once more through the same welding station.

Due to the fact that the preceding transverse trimming operation caused the ends of the lateral sectors 15 of the weld bead 5 facing the hole 14 of the link to be pointed, the ends 19 of the trimming tools 16 may be made of a weaker construction without danger that these end parts might brake off or these tools might become worn prematurely. This weaker construction of the ends 19 also permits the longitudinal trimming operation to be carried out even on very short links in which the hole 14 is very small.

For carrying out the succession of movements of the trimming tools of first trimming the weld bead on each chain link transversely and thereafter longitudinally, and for coupling these movements of the trimming tools with the required movements of the electrodes and welding tools, an apparatus for producing a round-link chain may be provided with suitable means for operatively connecting the trimming tools to the driving means of this apparatus so that the transverse trimming tools 7 and 8 may be actuated while the electrodes are still applied upon the round link 3 to be welded and the longitudinal trimming tools 16 may be actuated as soon as the electrodes have been removed from the link.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A method of producing a round-link chain comprising the steps of bending round rods to a round or oval shape and hooking them into each other so as to form connected links, pressing the ends of each link against each other while electrically welding them together by means of welding electrodes so as to form a weld bead on each link, trimming off diametrically opposite sectors of said weld bead by a transverse trimming operation by means of one pair of trimming tools by moving said tools in a direction at right angles to the plane of the link and immediately thereafter trimming off the remaining sectors of said weld bead in the longitudinal direction of said link by means of another pair of trimming tools having arcuate cutting edges in accordance with the peripheral surface of the rod material of the link.

2. A method as defined in claim 1, wherein at least said transverse trimming operation is carried out while said ends of said chain link are pressed against each other by upsetting tools and while the welding electrodes are still applied upon the chain link.

3. A method as defined in claim 2, wherein both trimming operations are carried out while said upsetting tools are still applied upon the chain link so as to hold the same in a fixed position.

4. A method as defined in claim 1, wherein said transverse trimming tools have substantially straight edges so that the end portions of the transverse trimming cuts have a substantially pointed shape and the longitudinal trimming tools have to exert a relatively low cutting pressure to trim off said end portions.

5. In an apparatus for producing a round-link chain having electric welding means including electrodes for welding together the ends of a circularly or ovally bent chain link into a hole of which the adjacent chain links are hooked, upsetting means for pressing said ends against each other so that during the welding operation a weld bead is formed on said welded ends, a pair of transverse trimming tools for first shearing off diametrically opposite sectors of said weld bead immediately after said welding operation in a direction substantially at a right angle to the longitudinal plane of said link and while said link is still gripped by said upsetting tools, and a pair of longitudinal trimming tools having arcuate cutting edges in accordance with the round surface of the rod material of said link for shearing off the remaining sectors of said well bead in a longitudinal direction at both sides of said plane immediately after said transverse trimming operation.

References Cited

UNITED STATES PATENTS

| | | | |
|---|---|---|---|
| 2,806,345 | 9/1957 | Phares | 59—29 |
| 2,824,420 | 2/1958 | Esser | 59—29 |
| 3,070,952 | 1/1963 | Wehln | 59—29 |
| 3,096,612 | 7/1963 | Coffey | 59—29 |

FOREIGN PATENTS

| | | |
|---|---|---|
| 1,212,396 | 3/1966 | Germany. |

CHARLES W. LANHAM, Primary Examiner

G. P. CROSBY, Assistant Examiner

U.S. Cl. X.R.

59—34, 35